United States Patent
Nakajima

(10) Patent No.: US 7,787,150 B2
(45) Date of Patent: Aug. 31, 2010

(54) PRINT DATA FORMING APPARATUS

(75) Inventor: Yoshiyuki Nakajima, Tokyo (JP)

(73) Assignee: Oki Data Corporation, Tokyo (JP)

( * ) Notice: Subject to any disclaimer, the term of this patent is extended or adjusted under 35 U.S.C. 154(b) by 600 days.

(21) Appl. No.: 11/677,672

(22) Filed: Feb. 22, 2007

(65) Prior Publication Data

US 2007/0201072 A1   Aug. 30, 2007

(30) Foreign Application Priority Data

Feb. 27, 2006   (JP) .............................. 2006-050494

(51) Int. Cl.
*G06K 9/00* (2006.01)
*G06K 1/00* (2006.01)
*G06K 15/00* (2006.01)
*G03F 3/08* (2006.01)

(52) U.S. Cl. ....................... 358/1.9; 358/1.12; 358/500; 382/162; 382/167

(58) Field of Classification Search ................ 358/1.13, 358/1.9, 2.1, 1.6, 3.23, 3.27, 518, 519, 400, 358/401, 500, 1.12; 345/472, 418, 501; 705/26; 395/106; 382/162, 167, 166; 348/333.05, 348/333.11
See application file for complete search history.

(56) References Cited

U.S. PATENT DOCUMENTS

| | | | |
|---|---|---|---|
| 6,552,743 B1 * | 4/2003 | Rissman | 348/207.2 |
| 6,567,088 B2 * | 5/2003 | Hayama | 345/472 |
| 7,307,643 B2 * | 12/2007 | Moroo et al. | 345/667 |
| 7,395,225 B2 * | 7/2008 | Fuwa et al. | 705/26 |
| 2005/0162688 A1 * | 7/2005 | Nakaoka et al. | 358/1.15 |

* cited by examiner

*Primary Examiner*—Jerome Grant, II
(74) *Attorney, Agent, or Firm*—Rabin & Berdo, P.C.

(57) ABSTRACT

In a print data forming apparatus, a color conversion information storing section stores plural color conversion information, a mode shift detecting section detects a shift to an image converting mode, an image conversion processing section forms plural printer characteristics images based on the stored respective color conversion information from received drawing data, a monitor image conversion processing section converts the printer characteristics images into plural monitor characteristics images which can be displayed on a monitor, and an input section requests a selection of a specific one of the displayed monitor characteristics images. An unnecessary consumption amount of sheets and toner is avoided in color reproducing mode settings of the print data forming apparatus having color conversion tables.

13 Claims, 12 Drawing Sheets

FIG.5

PRINTER
NAME [PRINTER AAA]   [PROPERTY]

PRINTING RANGE    THE NUMBER OF PRINTS [1]
● ALL
○ PRESENT PAGE
○ PAGE SETTING

FIG.6

| SETTINGS | PRINT OPTION | COLOR |

SHEET
  SIZE — A4
  FEEDING METHOD — TRAY
  SHEET THICKNESS — NORMAL

LAYOUT TYPE
  [NORMAL PRINT]

PRINT DATA FORMING APPARATUS

BACKGROUND OF THE INVENTION

1. Field of the Invention

The invention relates to a print data forming apparatus and, more particularly, to a print data forming apparatus in which a color reproducing mode and print quality can be set by the user.

2. Description of the Related Art

In a print data forming apparatus for reproducing a color image, it is an important technical subject to accurately reproduce the color image which is required by the user. To solve such a technical subject, there has also been disclosed a technique in which when the color image is reproduced, by previously printing and outputting color chip data and the color chip as a sample, the color chip data which is inputted by the user in order to designate a color is obtained, or the like (refer to JP-A-1995 (Heisei 07)-32657).

However, in the above conventional technique, for example, in the case where the print data forming apparatus holds a number of color conversion tables, many unnecessary printing processes have to be executed. Thus, there is still such a problem to be solved that consumables such as sheets, toner, and the like are additionally consumed. In other words, this is because in order to confirm what kind of print result will be obtained by the many color conversion tables held in the apparatus, there occurs a necessity to transmit print data to a printer and confirm the output images many times as in the cases of using a color conversion table A, using a color conversion table B, . . . , using a color conversion table N, and the like.

SUMMARY OF THE INVENTION

It is an object of the invention to provide a print data forming apparatus in which a color reproducing mode and print quality can be set by the user.

According to the present invention, there is provided a print data forming apparatus which forms a print characteristics image based on predetermined image conversion information from received image information and transmits the print characteristics image to a printing apparatus, comprising:

an image conversion information storing section which previously stores a plurality of the image conversion information;

a mode shift detecting section for detecting a shift toward an image converting mode which performs a selection of the image conversion information and performs an image conversion;

a print characteristics image conversion processing section which, when the mode shift detecting section detects the shift to the image converting mode, forms a plurality of print characteristics images based on the plurality of respective image conversion information stored in the image conversion information storing section from the received image information;

a display image conversion processing section which converts the plurality of print characteristics images into a plurality of display characteristics images which can be displayed to predetermined displaying section and allows the display characteristics images to be displayed; and a print condition setting section which requests a selection of a specific one of the plurality of display characteristics images displayed to the displaying section, wherein when the print condition setting section receives the selection of the specific display characteristics image, the print characteristics image conversion processing section forms the print characteristics image from the received image information on the basis of the image conversion information corresponding to the specific display characteristics image.

Moreover, the print data forming apparatus may further comprise a print characteristics information storing section which previously stores print characteristics information corresponding to a print quality of the printing apparatus, and wherein the print characteristics image conversion processing section forms the plurality of print characteristics images based on the plurality of respective image conversion information stored in the image conversion information storing section from the received image information, further, converts the plurality of print characteristics images on the basis of the print characteristics information, and allows them to correspond to the print quality of the printing apparatus.

Moreover, the print data forming apparatus may further comprise an image conversion information transmission request section which requests the printing apparatus to transmit predetermined image conversion information and obtains the image conversion information in place of the image conversion information storing section which previously stores the plurality of image conversion information, and wherein when the mode shift detecting section detects the shift to the image converting mode, the print characteristics image conversion processing section forms the plurality of print characteristics images based on the plurality of respective image conversion information obtained by the image conversion information transmission request section from the received image information.

Moreover, the print data forming apparatus may further comprise a print characteristics information transmission request section which requests the printing apparatus to transmit print characteristics information corresponding to a print quality of the printing apparatus and obtains the print characteristics information, and wherein the print characteristics image conversion processing section forms the plurality of print characteristics images based on the plurality of respective image conversion information obtained by the image conversion information transmission request section from the received image information, further converts the plurality of print characteristics images on the basis of the print characteristics information, and allows them to correspond to the print quality of the printing apparatus.

Moreover, in the print data forming apparatus, the print characteristics image conversion processing section may reduce a size of the received image information and may form the print characteristics image based on the predetermined image conversion information.

Further, according to the present invention, there is also provided a print data forming apparatus which converts received image information into print data which can be analyzed by a predetermined printing apparatus and transmits the print data to the printing apparatus, comprising:

a mode shift detecting section which detects a shift toward an image converting mode which selects a plurality of the image conversion information held in the printing apparatus and performs an image conversion;

an application data converting section which, when the mode shift detecting section detects the shift to the image converting mode, converts the received image information into the print data which can be analyzed by the printing apparatus;

a data transmitting section which transmits the print data and a return command for requesting a return of a plurality of print characteristics images converted on the basis of the plurality of respective image conversion information to the printing apparatus;

a data receiving section which receives the return of the plurality of print characteristics images;

a display image conversion processing section which converts the plurality of returned print characteristics images into a plurality of display characteristics images which can be displayed to predetermined displaying section and allows the display characteristics images to be displayed; and a print condition setting section which requests a selection of a specific one of the plurality of display characteristics images displayed to the displaying section, wherein when the print condition setting section receives the selection of the specific display characteristics image, the application data converting section allows a designation command of the image conversion information corresponding to the selected specific display characteristics image to be included in the print data.

Moreover, in the print data forming apparatus, the application data converting section may reduce a size of the received image information and may convert the image information into the print data that can be analyzed by the printing apparatus.

Moreover, in the print data forming apparatus, the application data converting section may convert partial data of the received image information into the print data that can be analyzed by the printing apparatus.

Moreover, the print data forming apparatus may further comprise a print operation discriminating section which discriminates an operating mode of the printing apparatus connected to the print data forming apparatus, and wherein when the print operation discriminating section determines a busy mode of the predetermined printing apparatus, the data transmitting section transmits the print data and the return command for requesting the return of the plurality of print characteristics images converted on the basis of the plurality of respective image conversion information to another printing apparatus whose idle mode is determined by the print operation discriminating section and which has the same function as that of the predetermined printing apparatus in place of the predetermined printing apparatus.

Since the display characteristics image based on the image conversion information of the image to be printed can be obtained prior to executing the actual printing process, such an effect that the user can easily select a desired hue and an unnecessary consumption amount of sheets, toner, and the like can be reduced is obtained.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 5 is an explanatory diagram of an example of a user interface display screen;

FIG. 6 is an explanatory diagram of an example of a printer property display screen;

DETAILED DESCRIPTION OF THE PREFERRED EMBODIMENTS

Figure 1:
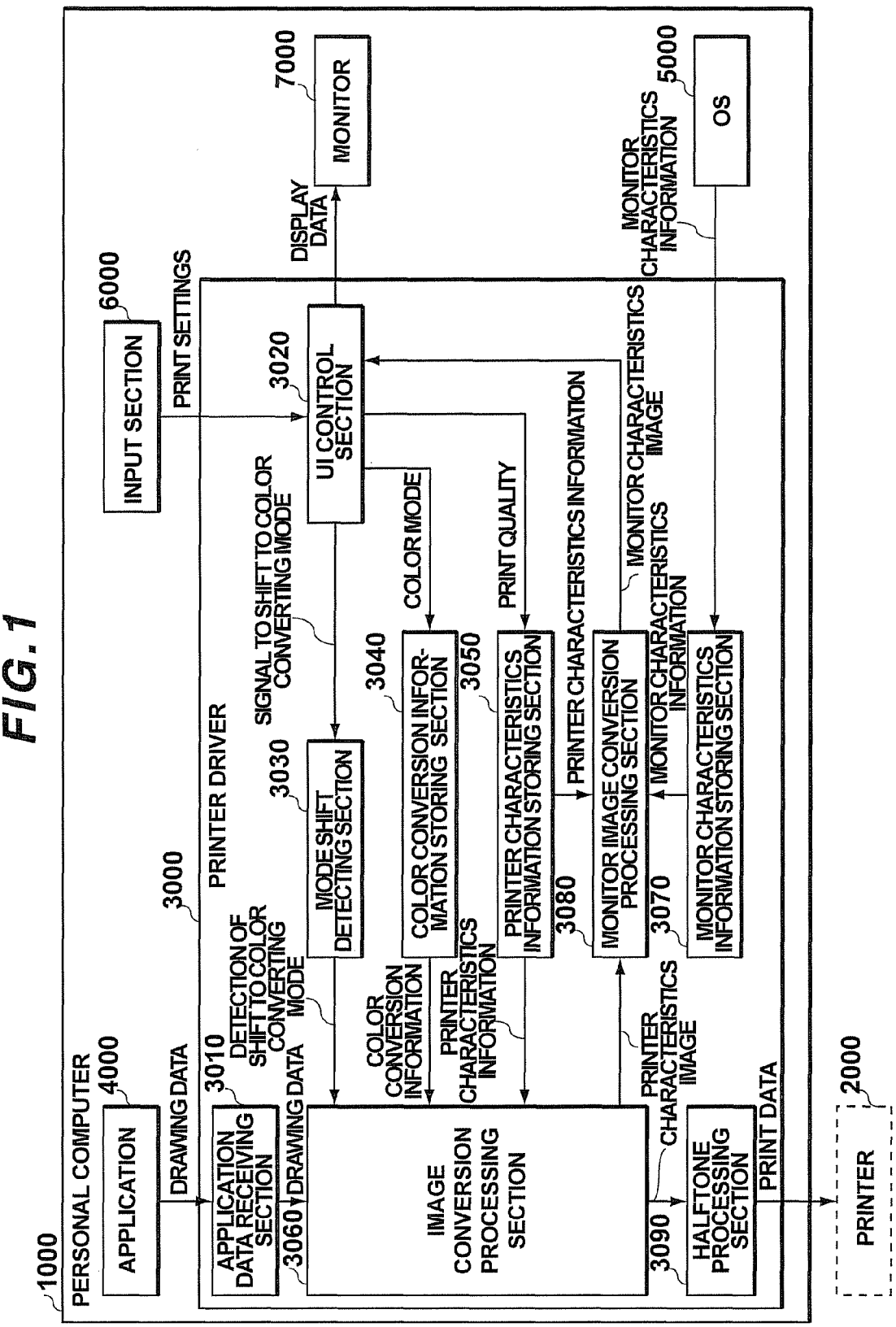
FIG. 1 is a block diagram of a construction of a personal computer according to an embodiment 1.

FIG. 1 is a block diagram of a construction of a personal computer according to an embodiment 1.

As shown in the diagram, a personal computer 1000 according to the embodiment 1 has a printer driver 3000, an application 4000, an operating system 5000, an input section 6000, and a monitor 7000 serving as a displaying section.

The printer driver 3000 has an application data receiving section 3010, a user interface control section 3020, a mode shift detecting section 3030, a color conversion information storing section 3040, a printer characteristics information storing section 3050, an image conversion processing section 3060, a monitor characteristics information storing section 3070, a monitor image conversion processing section 3080, and a halftone processing section 3090. The printer driver 3000 is a portion for converting drawing data which is received from the application 4000 into print data on the basis of print settings (color reproducing mode and print quality) which are inputted from the input section 6000 and transmitting it to a printer 2000. Further, the printer driver 3000 is a portion for receiving monitor characteristics information of the monitor 7000 from the operating system 5000 and transmitting it to the monitor 7000.

The application 4000 is a portion for forming a document, a statistical slip, or the like and transmitting its drawing data to the application data receiving section 3010. The operating system 5000 is an OS (operating system) for providing the monitor characteristics information serving as display characteristics of the monitor 7000 to the printer driver 3000. The input section 6000 is a portion for the user to input print settings such as color reproducing mode, print quality, and the like to form the print data to the printer driver 3000. The monitor 7000 is a portion for receiving the display data from the printer driver 3000 and displaying it.

Returning to the printer driver 3000 again, the above constructing portions will be described in detail. The application data receiving section 3010 is a portion for receiving the drawing data such as document, statistical slip, or the like from the application 4000 and transmitting it to the image conversion processing section 3060. The user interface control section 3020 is a portion for sharing such a role of a man-machine interface between the user and the printer driver 3000 that the print settings (color reproducing mode and print quality) are received or the like through the input section 6000 and the monitor 7000. The mode shift detecting section 3030 is a portion for detecting that the user has selected the color mode through the input section 6000 and notifying the image conversion processing section 3060 of it.

The color conversion information storing section 3040 is a portion for previously storing a plurality of (color conversion possible number indicative of the number of color conversions which are supported by the printer) color conversion information (color conversion tables) for executing each image converting process and transmitting the color conversion information corresponding to the color reproducing mode selected by the user to the image conversion processing section 3060. The printer characteristics information storing section 3050 is a portion for previously storing a plurality of (the number of printers which are supported by the personal computer) printer characteristics information which decides a correlation between an Lab color space as a calorimetric space which is independent of a device and CMYK concentration data obtained in consideration of characteristics of the printer 2000 and transmitting the corresponding printer characteristics information on the basis of the printer selected by the user to the image conversion processing section 3060. It is also possible to further provide, for example, an image conversion information transmission request section, a print characteristics information transmission request section, and the like and transmit the color conversion information and the printer characteristics information from the printer without previously storing them.

The image conversion processing section 3060 is a portion for converting the drawing data received from the application data receiving section 3010 into a printer characteristics image on the basis of the color conversion information received from the color conversion information storing section 3040 and the printer characteristics information received from the printer characteristics information storing section 3050. Explanation will be made further in detail hereinbelow.

Figure 2:
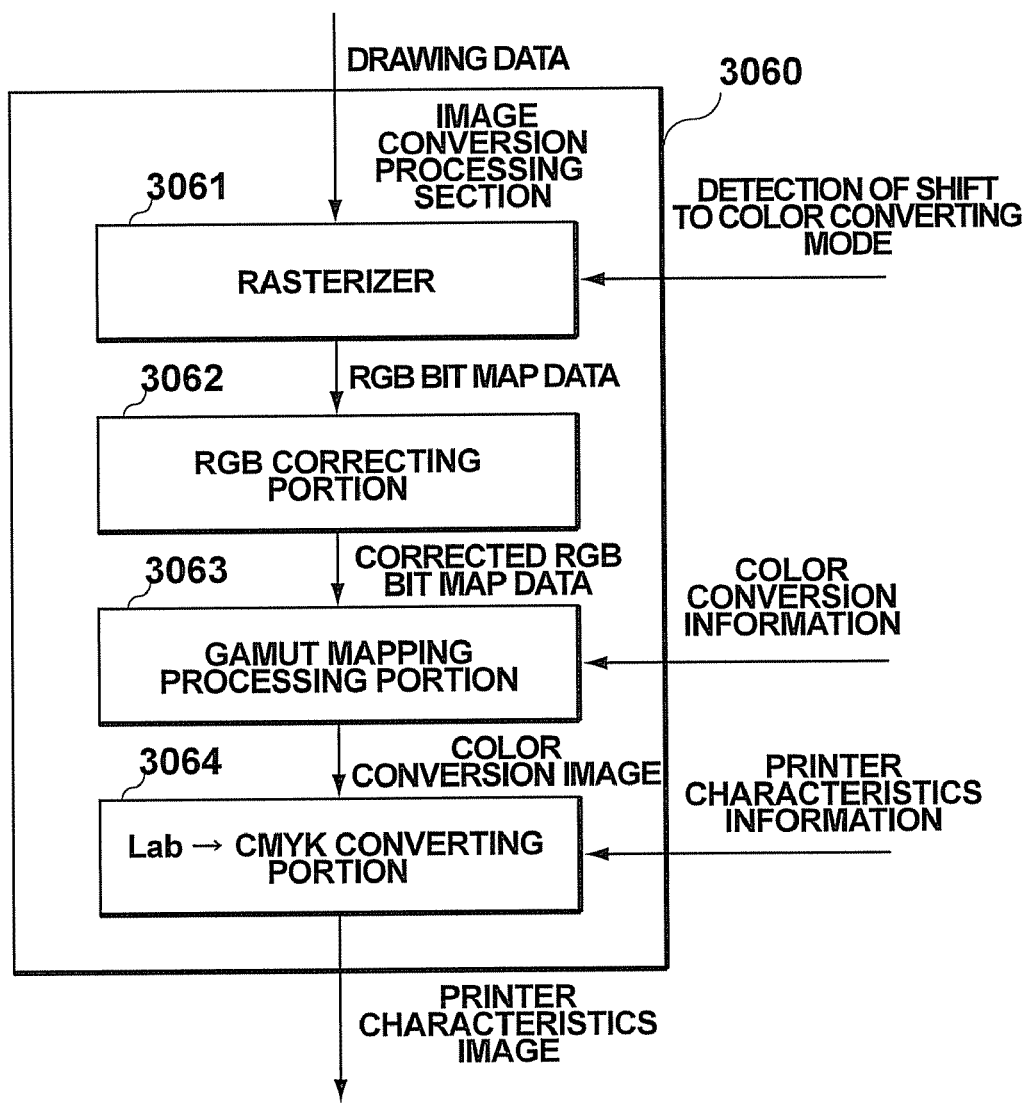
FIG. 2 is a functional block diagram of an image conversion processing section.

FIG. 2 is a functional block diagram of the image conversion processing section.

As shown in the diagram, the image conversion processing section 3060 includes a rasterizer 3061, an RGB correcting portion 3062, a gamut mapping processing portion 3063, and an Lab→CMYK converting portion 3064. The rasterizer 3061 is a portion for receiving the drawing data, developing into RGB data of a bit map, and transmitting it to the RGB correcting portion 3062. The RGB correcting portion 3062 is a portion for receiving the RGB bit map data from the rasterizer 3061 and correcting it in accordance with characteristics of an input device.

The gamut mapping processing portion 3063 is a portion for receiving the corrected RGB bit map data from the RGB correcting portion 3062, converting into Lab bit map data, mapping the Lab bit map data on the basis of the color conversion information (color conversion table) obtained from the color conversion information storing section 3040 (FIG. 1), and converting into a color conversion image compressed into a range which can be reproduced by the printer.

The Lab→CMYK converting portion 3064 is a portion for receiving the color conversion image (compressed into the range which can be reproduced by the printer) from the gamut mapping processing portion 3063 and converting into a printer characteristics image obtained in consideration of characteristics of the printer 2000 (FIG. 1) on the basis of the printer characteristics information obtained from the printer characteristics information storing section 3050 (FIG. 1).

Returning to FIG. 1, the monitor characteristics information storing section 3070 is a portion for storing monitor characteristics information which decides a correlation between the Lab color space and RGB luminance data obtained in consideration of characteristics of the monitor 7000 and transmitting it to the monitor image conversion processing section 3080. The monitor characteristics information is constructed by RGB values corresponding to 3-dimensional coordinates of the Lab color space and Lab values corresponding to 3-dimensional coordinates of RGB. The monitor image conversion processing section 3080 is a portion for converting the printer characteristics image obtained from the image conversion processing section 3060 into a monitor characteristics image obtained in consideration of the characteristics of the monitor 7000 and transmitting it to the monitor 7000. Explanation will be made further in detail hereinbelow.

Figure 3:
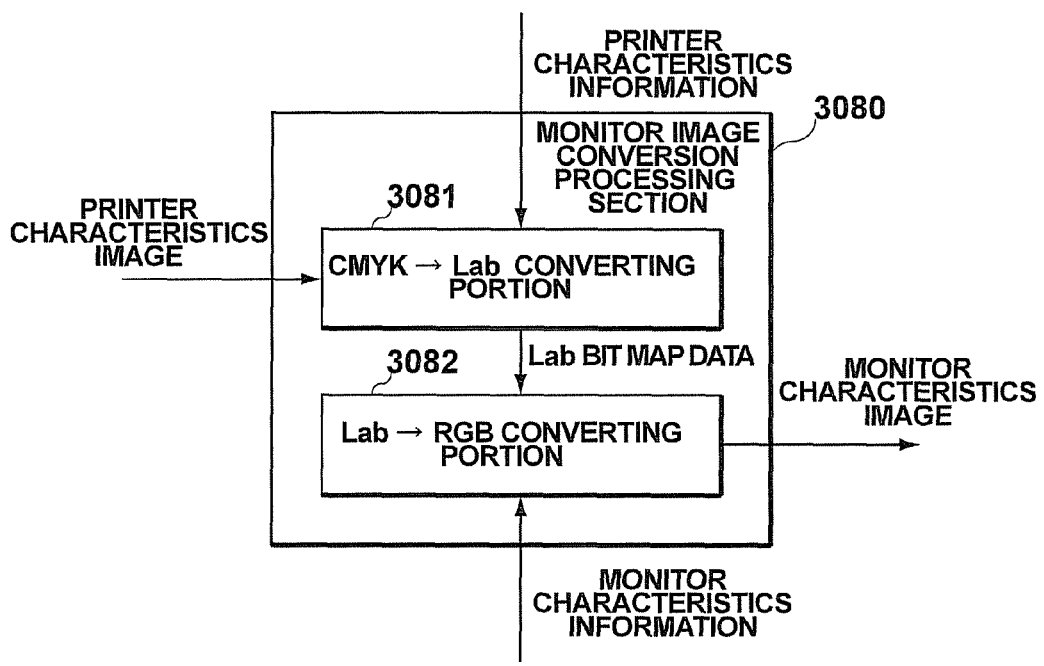
FIG. 3 is a functional block diagram of a monitor image conversion processing section.

FIG. 3 is a functional block diagram of the monitor image conversion processing section.

As shown in the diagram, the monitor image conversion processing section 3080 includes a CMYK→Lab converting portion 3081 and an Lab→RGB converting portion 3082. The CMYK→Lab converting portion 3081 is a portion for converting the CMYK bit map data received from the image conversion processing section 3060 (FIG. 1) into Lab bit map data. The Lab→RGB converting portion 3082 is a portion for receiving the Lab bit map data from the CMYK→Lab converting portion 3081, converting into the monitor characteristics image consisting of the RGB values on the basis of the monitor characteristics information obtained from the monitor characteristics information storing section 3070 (FIG. 1), and transmitting it to the monitor 7000 (FIG. 1) through the user interface control section 3020.

Returning to FIG. 1, the halftone processing section 3090 is a portion for receiving the printer characteristics image from the image conversion processing section 3060, converting into the print data, and transmitting it to the printer 2000. It is now assumed that the printer 2000 has three modes of "fine", "normal", and "fast" with respect to the print quality and has five modes of "monitor (5600K/contrast priority)", "monitor (5600K/brilliance priority)", "monitor (9300K)", "digital camera", and "sRGB" with respect to the color reproducing mode. By receiving the print data corresponding to those print settings, the printing of the different print quality and color reproducing mode can be performed.

The operation of the embodiment 1 will be described.

Figure 4:
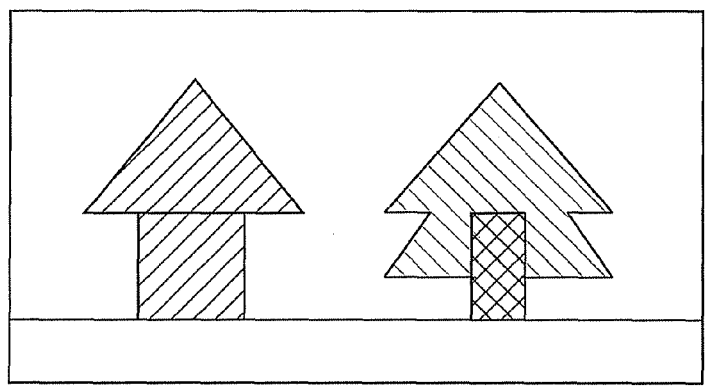
FIG. 4 is an explanatory diagram of an example of application data.

FIG. 4 is an explanatory diagram of an example of application data.

FIG. 5 is an explanatory diagram of an example of a user interface display screen.

FIG. 6 is an explanatory diagram of an example of a printer property display screen.

Figure 7:
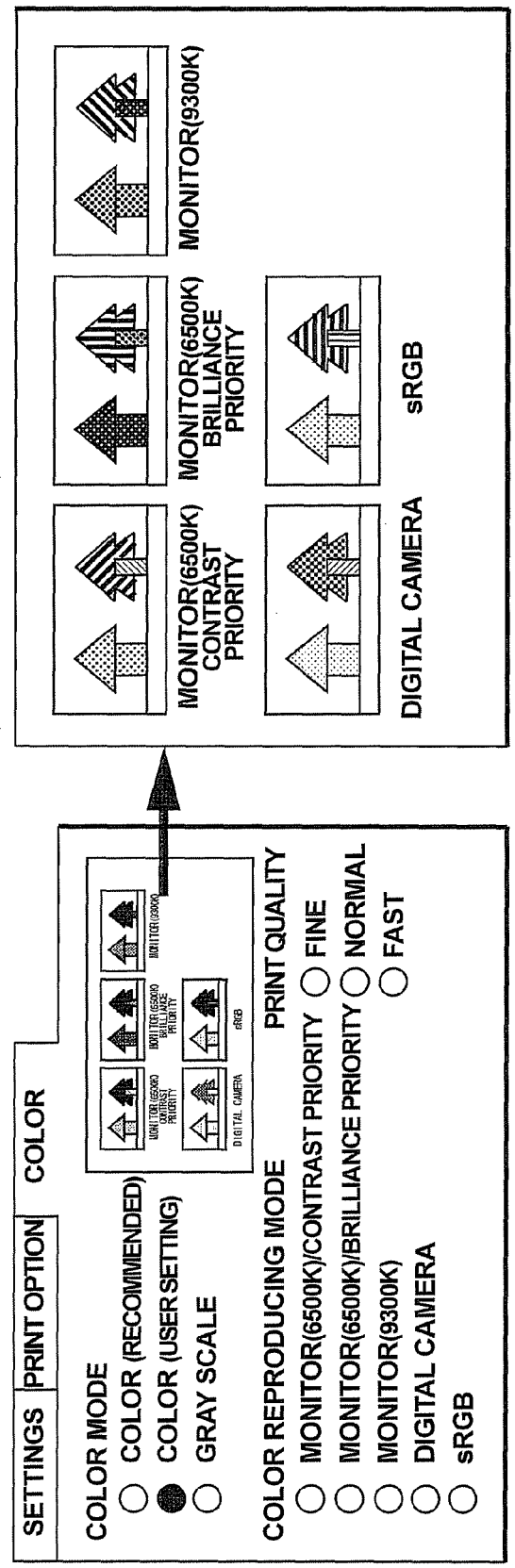
FIG. 7 is an explanatory diagram of an example of a color mode setting display screen.

FIG. 7 is an explanatory diagram of an example of a color mode setting display screen.

Figure 8:
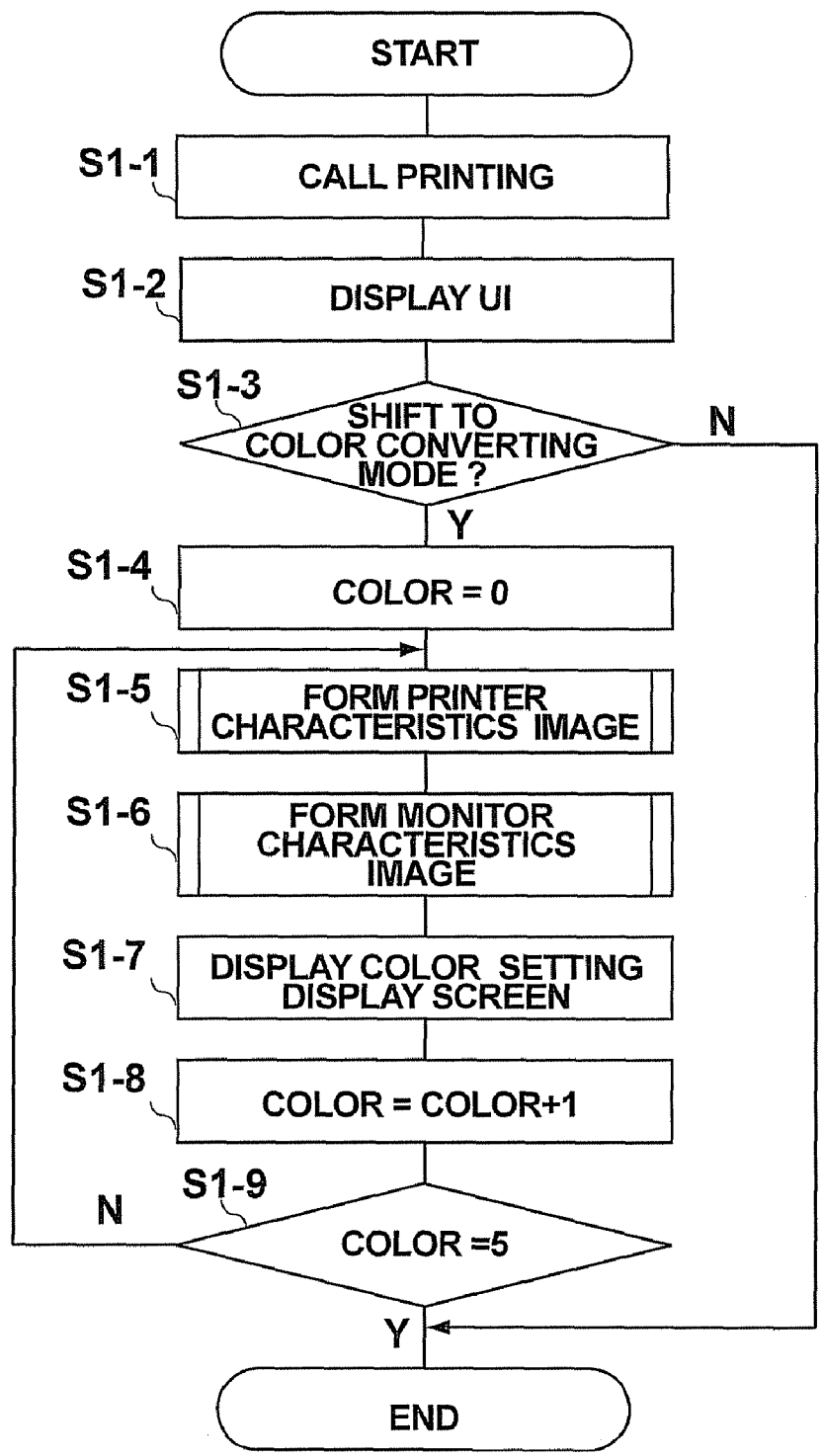
FIG. 8 is an operation flowchart for a print data forming apparatus according to the embodiment 1.

FIG. 8 is an operation flowchart for the print data forming apparatus according to the embodiment 1.

The operation which is executed until a plurality of monitor characteristics images are displayed on the monitor 7000 (FIG. 1) in the personal computer 1000 (FIG. 1) will now be explained in order of steps S1-1 to S1-9 with reference to FIG. 8. FIGS. 4, 5, 6, and 7 will be described in the operation explanation as necessary.

Step S1-1:

When a document as shown in FIG. 4 is formed and the printing is called by instructing the printing by the application 4000 (FIG. 1), the application data receiving section 3010 (FIG. 1) receives application data for printing a color image corresponding to FIG. 4 which has been transmitted from the application 4000 (FIG. 1). It is assumed that hatched portions in FIG. 4 indicate different colors.

Step S1-2:

The user interface control section 3020 (FIG. 1) allows the monitor 7000 (FIG. 1) to display a user interface (UI) display screen shown in FIG. 5.

Step S1-3:

When the user selects a property of the user interface display screen shown in FIG. 5, the user interface control section 3020 (FIG. 1) allows the monitor 7000 (FIG. 1) to display a printer property display screen shown in FIG. 6. When a color tab on the display (FIG. 6) is selected by the user, the user interface control section 3020 (FIG. 1) allows the monitor 7000 (FIG. 1) to display a color mode setting display screen shown in FIG. 7. At this time, the mode shift detecting section 3030 (FIG. 1) detects the shift to a color converting mode. The mode shift detecting section 3030 (FIG. 1) notifies the image conversion processing section 3060 (FIG. 1) of it and the processing routine advances to step S1-4. If the shift to the color converting mode is not detected, the processing routine is finished.

Step S1-4:

The image conversion processing section 3060 (FIG. 1) sets "color=0" into a color mode index held therein. It is now assumed that, for instance, "color=0" indicates "monitor (5600K/contrast priority)", subsequent "color=1" indicates "monitor (5600K/brilliance priority)", "color=2" indicates "monitor (9300K)", "color=3" indicates "digital camera", and "color=4" indicates "sRGB", respectively.

Step S1-5:

For the drawing data received from the application data receiving section 3010 (FIG. 1), the image conversion processing section 3060 (FIG. 1) obtains the color conversion information corresponding to the color reproducing mode designated by the color mode index from the color conversion information storing section 3040 (FIG. 1), further obtains the printer characteristics information corresponding to the print quality set at this point of time from the printer characteristics information storing section 3050 (FIG. 1), and forms the printer characteristics image by using those information. This processing step will be explained again in detail hereinafter. As for the print quality, the values upon previous printing have been stored in a print quality index (quality=0: fine, 1: normal, 2: fast) held in the image conversion processing section 3060 (FIG. 1), or the user may select and update the print quality in FIG. 7 in step S1-3.

Step S1-6:

For the printer characteristics image received from the image conversion processing section 3060 (FIG. 1), the monitor image conversion processing section 3080 (FIG. 1) obtains the printer characteristics information corresponding to the print quality set at this point of time from the printer characteristics information storing section 3050 (FIG. 1) and forms the monitor characteristics image by using the printer characteristics information. This processing step will be explained again in detail hereinafter.

Step S1-7:

The monitor image conversion processing section 3080 (FIG. 1) transmits the formed monitor characteristics image to the monitor 7000 (FIG. 1) through the user interface control section 3020 and allows the monitor 7000 (FIG. 1) to display it onto the color mode setting display screen shown in FIG. 7.

Step S1-8:

The image conversion processing section 3060 (FIG. 1) sets the next color reproducing mode by adding "1" to the color mode index held therein.

Step S1-9:

If five kinds of images showing all of the color reproducing modes have been displayed as shown in FIG. 7, the processing routine is finished. In other cases, the processing routine is returned to step S1-5 and the processes of steps S1-5 to S1-9 are repeated. After the five kinds of images were displayed as shown in FIG. 7, the processing routine is finished.

Figure 9:
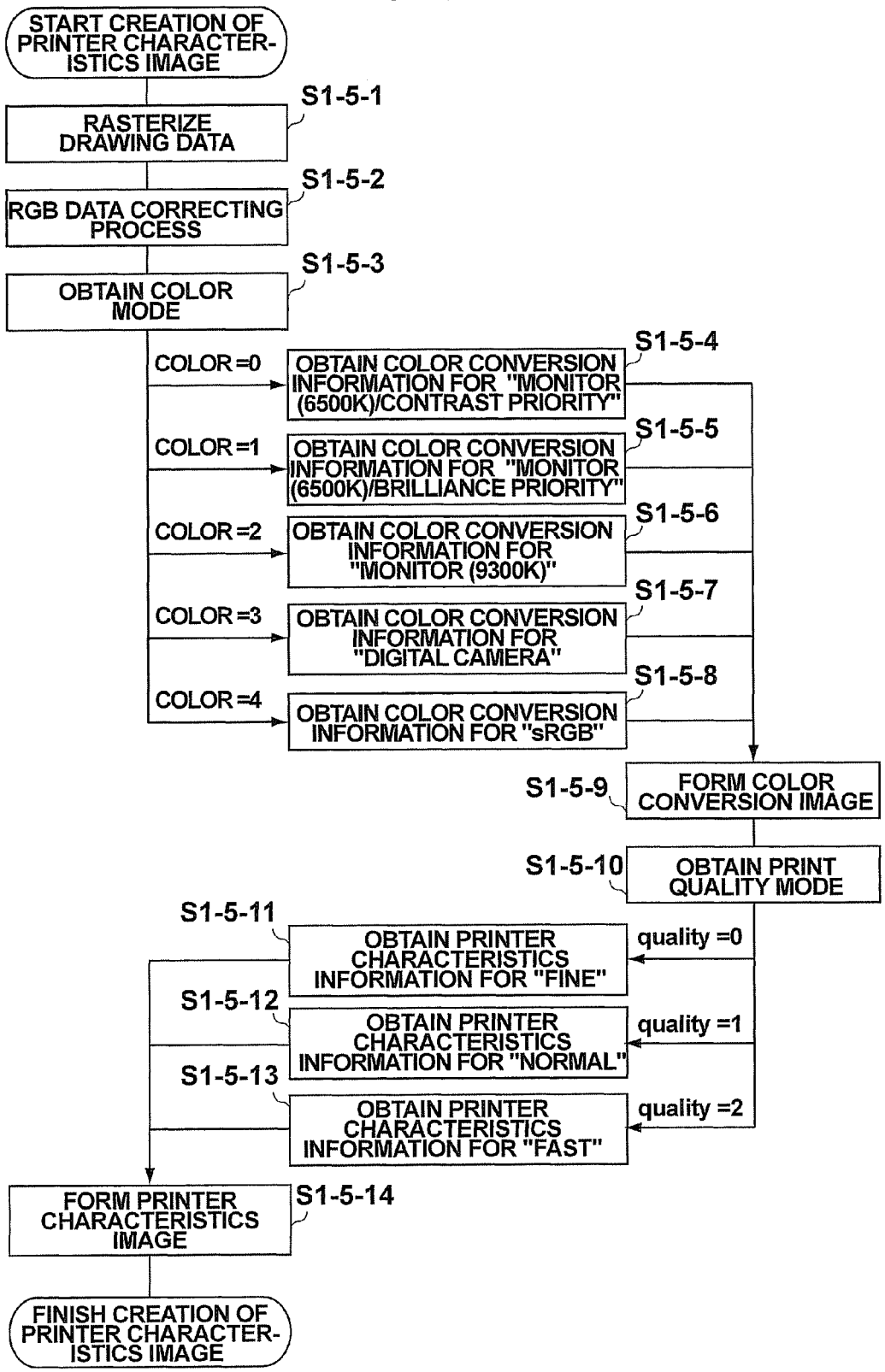
FIG. 9 is a detailed flowchart of step S1-5.

Subsequently, Step S1-5 will be explained in detail again. FIG. 9 is a detailed flowchart of step S1-5.

Step S1-5-1:

When the mode shift detecting section 3030 (FIG. 1) detects the shift to the color converting mode (selection of the color tab), the rasterizer 3061 (FIG. 2) rasterizes the received drawing data and forms RGB bit map data.

Step S1-5-2:

When the RGB bit map data is received from the rasterizer 3061 (FIG. 2), the RGB correcting portion 3062 (FIG. 2) corrects it by sRGB and transmits it as correction RGB bit map data to the gamut mapping processing portion 3063 (FIG. 2).

Step S1-5-3:

The gamut mapping processing portion 3063 (FIG. 2) obtains the color reproducing modes (color=0 to 4) from the color mode index.

Steps S1-5-4 to S1-5-8:

The gamut mapping processing portion 3063 (FIG. 2) obtains the color conversion information corresponding to the obtained color reproducing modes (color=0 to 4).

Step S1-5-9:

The gamut mapping processing portion 3063 (FIG. 2) converts the corrected RGB bit map data received from the RGB correcting portion 3062 into the Lab bit map data, performs gamut mapping on the Lab color space on the basis of the obtained color conversion information, and forms a color conversion image.

Step S1-5-10:

The Lab→CMYK converting portion 3064 (FIG. 2) obtains the print quality modes (quality=0 to 2) from a print quality mode index.

Steps S1-5-11 to S1-5-13:

The Lab→CMYK converting portion 3064 (FIG. 2) obtains the printer characteristics information corresponding to the print quality modes (quality=0 to 2) from the printer characteristics information storing section 3050 (FIG. 1). In the diagram, "fine" indicates 1200 dpi, "normal" indicates 600 dpi+trimming process, and "fast" indicates 600 dpi.

Step S1-5-14:

The Lab→CMYK converting portion 3064 (FIG. 2) forms a printer characteristics image from the color conversion image received from the gamut mapping processing portion 3063 (FIG. 2) on the basis of the obtained printer characteristics information and the processing routine is finished.

Figure 10:
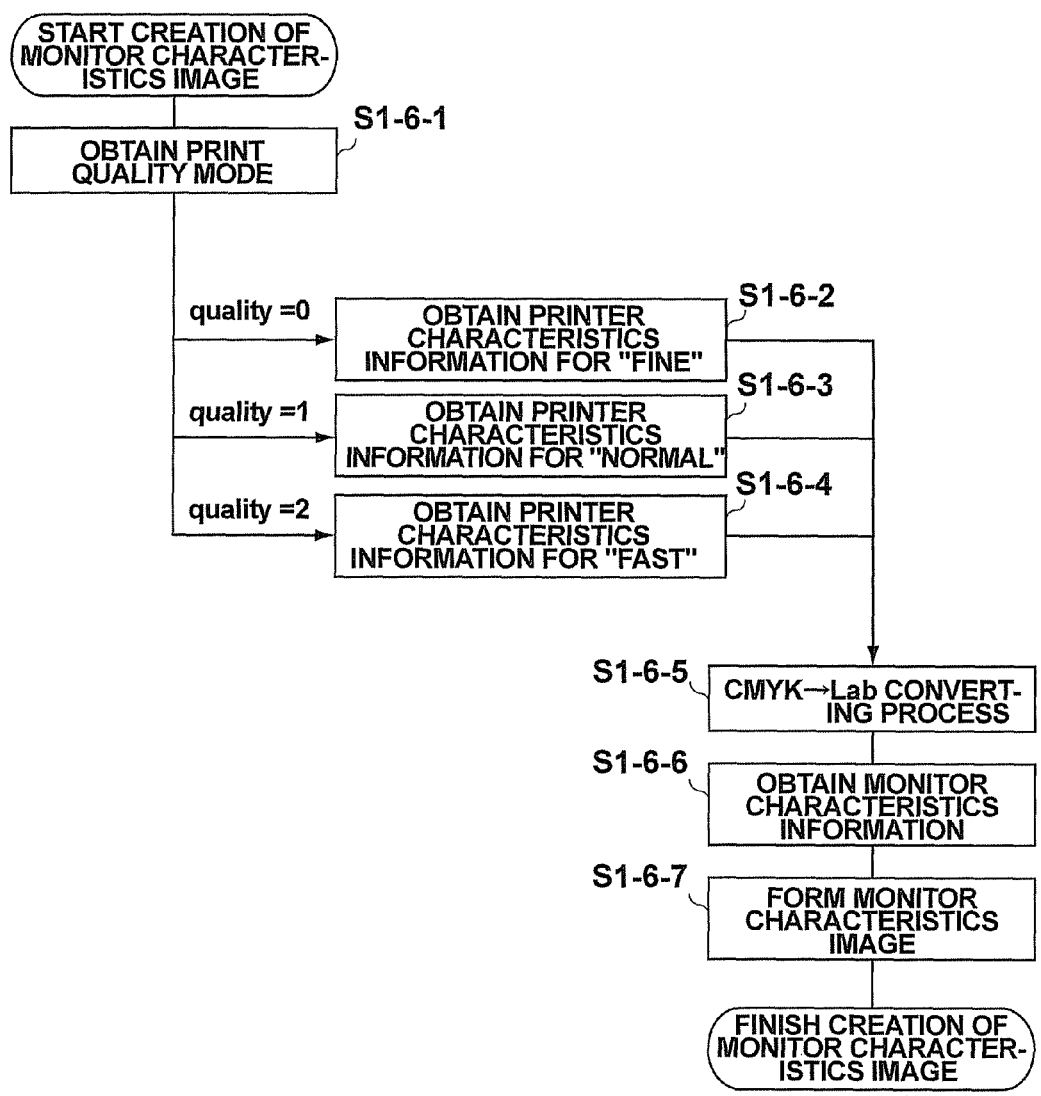
FIG. 10 is a detailed flowchart of step S1-6.

Subsequently, step S1-6 will be described again in detail. FIG. 10 is a detailed flowchart of step S1-6.

Step S1-6-1:

The CMYK→Lab converting portion 3081 (FIG. 3) obtains the print quality modes (quality=0 to 2) from the print quality index Steps S1-6-2 to S1-6-4:

The CMYK→Lab converting portion 3081 (FIG. 3) obtains the printer characteristics information corresponding to the print quality modes (quality=0 to 2) from the printer characteristics information storing section 3050 (FIG. 1).

Step S1-6-5:

The CMYK→Lab converting portion 3081 (FIG. 3) converts the printer characteristics image received from the image conversion processing section 3060 (FIG. 1) into the Lab bit map data on the basis of the obtained printer characteristics information.

Step S1-6-6:

The Lab→RGB converting portion 3082 (FIG. 3) obtains the corresponding monitor characteristics information from the monitor characteristics information storing section 3070 (FIG. 1).

Step S1-6-7:

The Lab→RGB converting portion 3082 (FIG. 3) forms a monitor characteristics image from the Lab bit map data received from the CMYK→Lab converting portion 3081 (FIG. 3) on the basis of the monitor characteristics information and the processing routine is finished.

By tracing the flow described above, the user observes the images of the color reproducing modes displayed in FIG. 7, selects and sets the desired color reproducing mode, and sets (or confirms) the print quality again. Thus, the print data according to the user's desired color reproducing mode and print quality is formed and transmitted to the printer 2000 (FIG. 1).

Although a display screen size of the drawing data received from the application 4000 (FIG. 1) is not mentioned in the above description, a processing speed can be also raised by executing the above processes in the state where the data size has been reduced into 1/32 or 1/64 without processing the received drawing data as it is.

As described above, according to the embodiment, since the images based on all of the color reproducing modes which can be printed are displayed on the monitor prior to executing the actual printing process, such an effect that the user can easily select a desired hue with reference to the monitor images is obtained. Thus, such an effect that the unnecessary consumption amount of the sheets, toner, and the like can be reduced is obtained. Further, since the monitor images are displayed in consideration of the color characteristics of the monitor and the printer, an effect in which there is no difference between the hue of the monitor image and that of the print characteristics image is obtained.

Embodiment 2

Although the embodiment 1 has been described on the assumption that the printer driver of the personal computer has the image conversion processing function, a case where the printer driver does not have the image conversion processing function is also presumed. The embodiment 2 will be described with respect to an application example of the invention in the case where the printer driver does not have the image conversion processing function.

Figure 11:
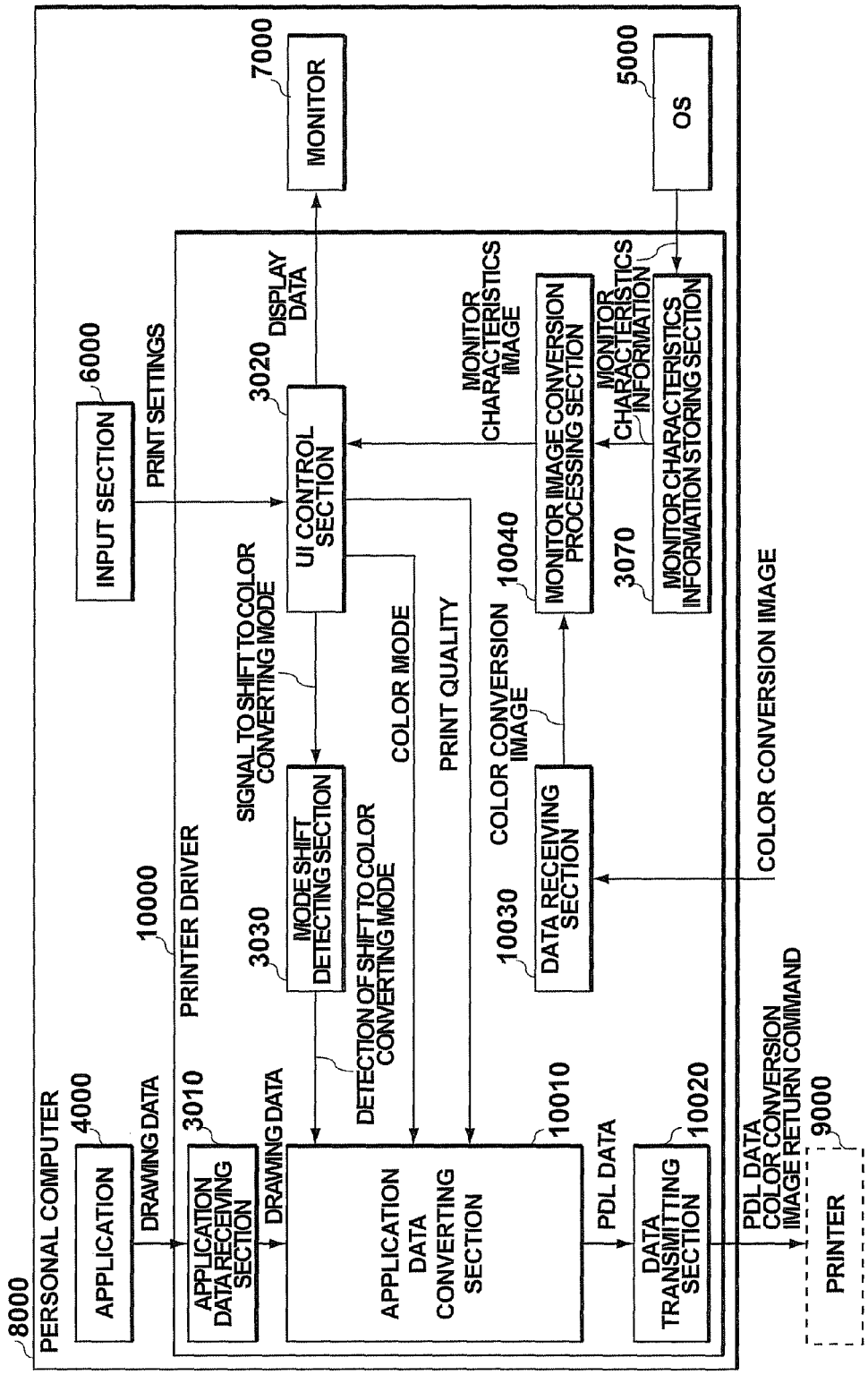
FIG. 11 is a block diagram of a construction of a personal computer according to an embodiment 2.

FIG. 11 is a block diagram of a construction of the personal computer according to the embodiment 2.

As shown in the diagram, a personal computer 8000 according to the embodiment 2 has a printer driver 10000, the application 4000, the operating system 5000, the input section 6000, and the monitor 7000. Only portions different from those in the embodiment 1 will be described in detail hereinbelow. Portions similar to those in the embodiment 1 will be designated by the same reference numerals and their explanation is omitted here.

The printer driver 10000 has the application data receiving section 3010, the user interface control section 3020, the mode shift detecting section 3030, the monitor characteristics information storing section 3070, an application data converting section 10010, a data transmitting section 10020, a data receiving section 10030, and a monitor image conversion processing section 10040. The printer driver 10000 is a portion for converting the drawing data which is received from the application 4000 into PDL data which can be interpreted by the printer, adds a command to designate the print settings (color reproducing mode and print quality) which are inputted from the input section 6000 to the PDL data, and transmitting it to a printer 9000. The printer driver 10000 is also a portion for transmitting a color conversion image return command to the printer 9000 and receiving the color conversion image which is returned. Further, the printer driver 10000 is a portion for receiving the monitor characteristics information of the monitor 7000 from the operating system 5000 and transmitting the display data to the monitor 7000.

The application data converting section 10010 is a portion for adding the command to designate the color reproducing mode and the print quality upon printing by the printer 9000 to the drawing data which is received from the application data receiving section 3010 and converting into the PDL data which can be printed by the printer 9000.

The data transmitting section 10020 is a portion for transmitting the PDL data and the color conversion image return command for returning a color conversion image formed by the printer 9000 on the basis of the PDL data to the printer driver 10000. The color conversion image is data expressed by Lab values obtained by a method whereby the printer 9000 color-conversion processes the PDL data received from the data transmitting section 10020 on the basis of the designated color reproducing mode.

The data receiving section 10030 is a portion for receiving the color conversion image from the printer 9000. The monitor image conversion processing section 10040 is a portion for receiving the color conversion image from the data receiving section 10030 and converting into the monitor characteristics image obtained in consideration of the characteristics of the monitor 7000.

Figure 12:
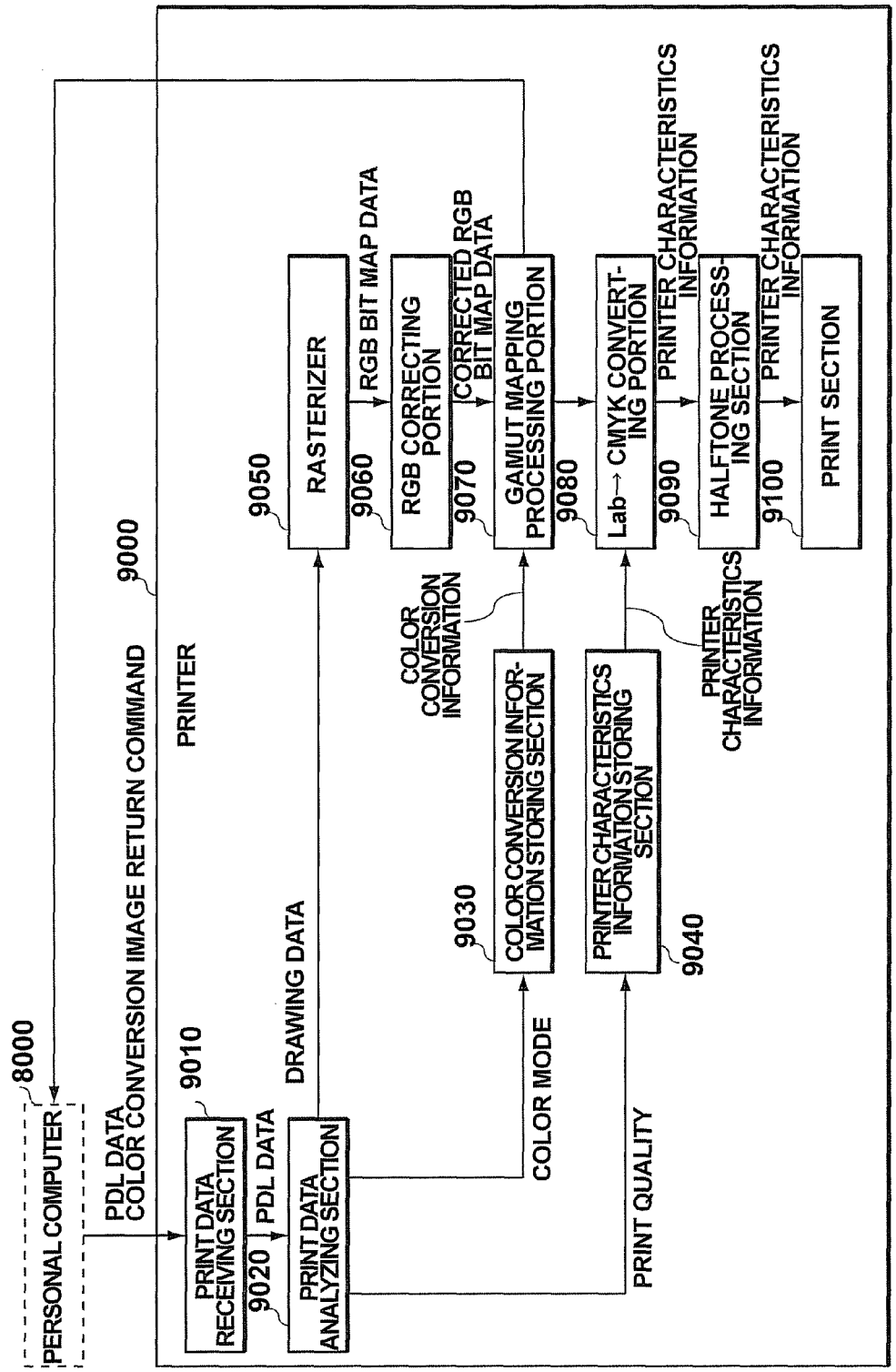
FIG. 12 is a block diagram of a construction of a printer which is used in the embodiment 2.

FIG. 12 is a block diagram of a construction of the printer which is used in the embodiment 2.

As shown in the diagram, the printer 9000 which is used in the embodiment 2 has a print data receiving section 9010, a print data analyzing section 9020, a color conversion information storing section 9030, a printer characteristics information storing section 9040, a rasterizer 9050, an RGB correcting portion 9060, a gamut mapping processing portion 9070, an Lab→CMYK converting portion 9080, a halftone processing section 9090, and a print section 9100. The printer 9000 is an image forming apparatus for receiving the PDL data added with the command to designate the print settings (color reproducing mode and print quality) from the personal computer 8000 and print-processing it. The printer 9000 is also an image forming apparatus for receiving the color conversion image return command from the personal computer 8000 and returning the color conversion image.

Further, it is assumed that the printer 9000 has three modes of "fine", "normal", and "fast" with respect to the print quality and has five modes of "monitor (5600K/contrast priority)", "monitor (5600K/brilliance priority)", "monitor (9300K)", "digital camera", and "sRGB" with respect to the color reproducing mode. The printer 9000 is also an image forming apparatus for executing the printing processes of the different print quality and color reproducing mode by those print settings.

The print data receiving section 9010 is a portion for receiving the PDL data and the color conversion image return command from the personal computer 8000. The print data analyzing section 9020 is a portion for analyzing the received PDL data, extracting the drawing data, color reproducing mode setting, and print quality setting, and transmitting the drawing data to the rasterizer 9050, the color reproducing mode setting to the color conversion information storing section 9030, and the print quality setting to the printer characteristics information storing section 9040, respectively.

The color conversion information storing section 9030 is a portion for previously storing a plurality of (color conversion possible number indicative of the number of color conversions which are supported by the printer) color conversion information (color conversion tables) for executing each image converting process and transmitting the color conversion information corresponding to the designated color reproducing mode to the gamut mapping processing portion 9070.

The printer characteristics information storing section 9040 is a portion for previously storing a plurality of (the number of modes of the print quality) printer characteristics information which decides the correlation between the Lab color space as a calorimetric space which is independent of the device and the CMYK concentration data obtained in consideration of the characteristics of the printer 9000 and transmitting the corresponding printer characteristics information to the Lab→CMYK converting portion 9080 on the basis of the designated print quality.

The rasterizer 9050 is a portion for receiving the drawing data from the print data analyzing section 9020, developing into the RGB data of the bit map, and transmitting it to the RGB correcting portion 9060. The RGB correcting portion 9060 is a portion for receiving the RGB bit map data from the rasterizer 9050 and correcting it in accordance with a definition of the RGB.

The gamut mapping processing portion 9070 is a portion for receiving the corrected RGB bit map data from the RGB correcting portion 9060, converting into Lab bit map data, mapping the Lab bit map data on the basis of color conversion information (color conversion table) obtained from the color conversion information storing section 9030, and converting into a color conversion image which can be reproduced by the print section 9100.

The Lab→CMYK converting portion 9080 is a portion for receiving the color conversion image (compressed into the range which can be reproduced by the printer) from the gamut mapping processing portion 9070 and converting into a printer characteristics image obtained in consideration of characteristics of the print section 9100 on the basis of the printer characteristics information obtained from the printer characteristics information storing section 9040.

The halftone processing section 9090 is a portion for receiving the printer characteristics image from the Lab→CMYK converting portion 9080, converting into the print data, and transmitting it to the print section 9100. The print section 9100 is a portion for printing the print data.

The operation of the embodiment 2 will be described.

Figure 13:
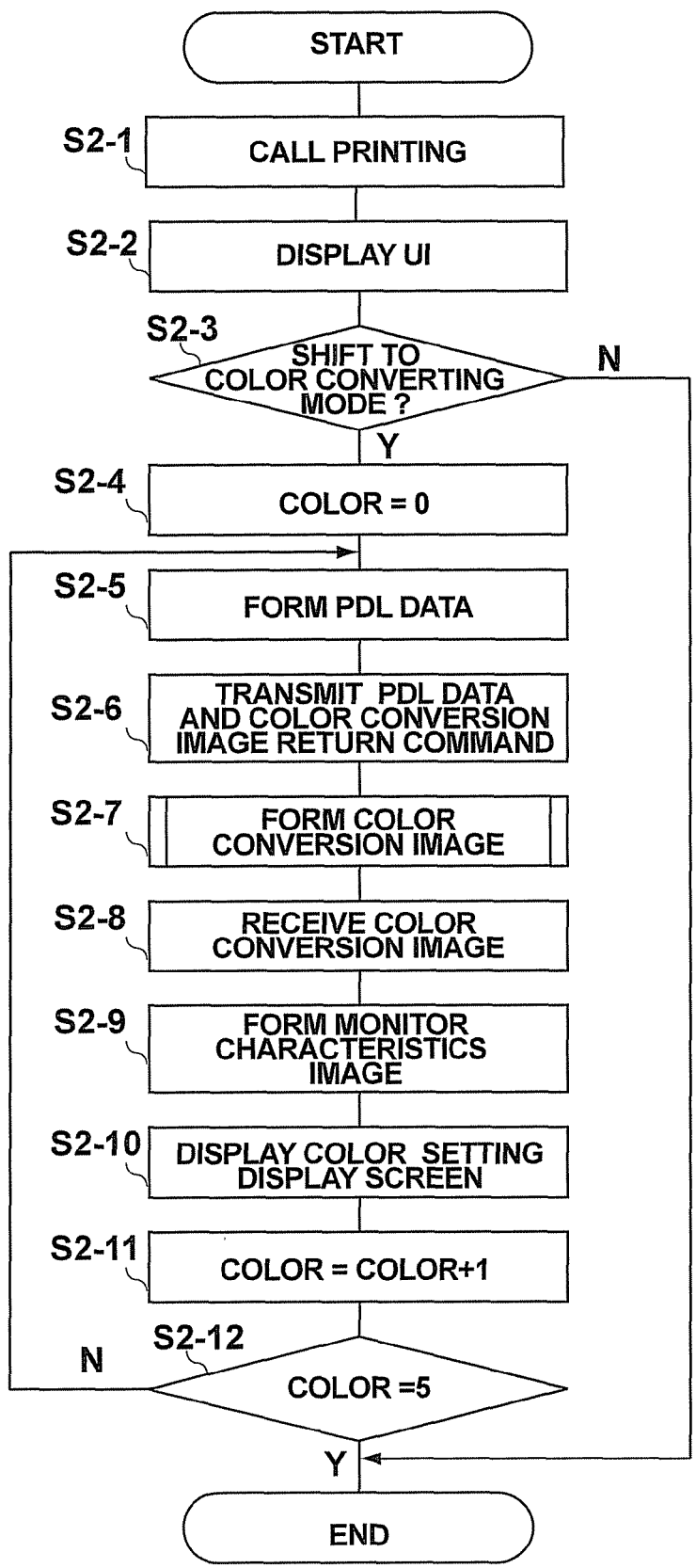
FIG. 13 is an operation flowchart for a print data forming apparatus according to the embodiment 2.

FIG. 13 is an operation flowchart for a print data forming apparatus according to the embodiment 2.

The operation which is executed until a plurality of monitor characteristics images are displayed on the monitor 7000 (FIG. 11) in the personal computer 8000 (FIG. 11) will now be explained in order of steps S2-1 to S2-12 with reference to FIGS. 13, 4, 5, 6, and 7.

Step S2-1:

When the printing is called from the application 4000 (FIG. 11), the application data receiving section 3010 (FIG. 11) receives application data for printing a color image corresponding to FIG. 4 which has been transmitted from the application 4000 (FIG. 11).

Step S2-2:

The user interface control section 3020 (FIG. 11) allows the monitor 7000 (FIG. 11) to display the user interface display screen shown in FIG. 5.

Step S2-3:

When the user selects the property of the user interface display screen shown in FIG. 5, the user interface control section 3020 (FIG. 11) allows the monitor 7000 (FIG. 11) to display the printer property display screen shown in FIG. 6. When the color tab on the display (FIG. 6) is selected by the user, the user interface control section 3020 (FIG. 11) allows the monitor 7000 (FIG. 11) to display the color mode setting display screen shown in FIG. 7. At this time, the mode shift detecting section 3030 (FIG. 11) detects the shift to the color converting mode. The mode shift detecting section 3030 (FIG. 11) notifies the application data converting section 10010 (FIG. 11) of it and the processing routine advances to step S2-4. If the shift to the color converting mode is not detected, the processing routine is finished.

Step S2-4:

The application data converting section 10010 (FIG. 11) sets "color=0" into a color mode index held therein. It is now assumed that, for instance, "color=0" indicates "monitor (5600K/contrast priority)", subsequent "color=1" indicates "monitor (5600K/brilliance priority)", "color=2" indicates "monitor (9300K)", "color 3" indicates "digital camera", and "color=4" indicates "sRGB", respectively.

Step S2-5:

The application data converting section 10010 (FIG. 11) adds a command for designating the color reproducing mode designated by the color mode index and the print quality mode which has been set at this point of time to the drawing data received from the application data receiving section 3010 (FIG. 11) and forms the PDL data which can be printed by the printer 9000. As for the print quality, the values upon previous printing have been stored in the print quality index (quality=0: fine, 1: normal, 2: fast) held in the application data converting section 10010 (FIG. 11), or the user may select and update the print quality in FIG. 7 in step S2-3.

Step S2-6:

The data transmitting section 10020 transmits the PDL data formed in the application data converting section 10010 (FIG. 11) and the color conversion image return command to the printer 9000.

Step S2-7:

The printer 9000 (FIG. 11) receives the PDL data and the color conversion image return command from the data transmitting section 10020, forms a color conversion image on the basis of the designated color reproducing mode and print quality mode, and returns it to the personal computer 8000 (FIG. 11). This step will be described again in detail hereinafter.

Step S2-8:

The data receiving section 10030 (FIG. 11) receives the color conversion image from the printer 9000 (FIG. 11).

Step S2-9:

For the color conversion image expressed by the Lab color space obtained from the data receiving section 10030 (FIG. 11), the monitor image conversion processing section 10040 (FIG. 11) forms an RGB monitor characteristics image by using the monitor characteristics information which has been obtained from the operating system 5000 (FIG. 11) and stored in the monitor characteristics information storing section 3070 (FIG. 11).

Step S2-10:

The monitor image conversion processing section 10040 (FIG. 11) transmits the formed RGB monitor characteristics image to the monitor 7000 (FIG. 11) through the user interface control section 3020 and allows the monitor 7000 to display it onto the color mode setting display screen shown in FIG. 7.

Step S2-11:

The application data converting section 10010 (FIG. 11) sets the next color reproducing mode by adding "1" to the color mode index held therein.

Step S2-12:

If five kinds of images showing all of the color reproducing modes have been displayed as shown in FIG. 7, the processing routine is finished. In other cases, the processing routine is returned to step S2-5 and the processes of steps S2-5 to S2-12 are repeated. After the five kinds of images were displayed as shown in FIG. 7, the processing routine is finished.

Subsequently, Step S2-7 will be explained in detail again.

Figure 14:
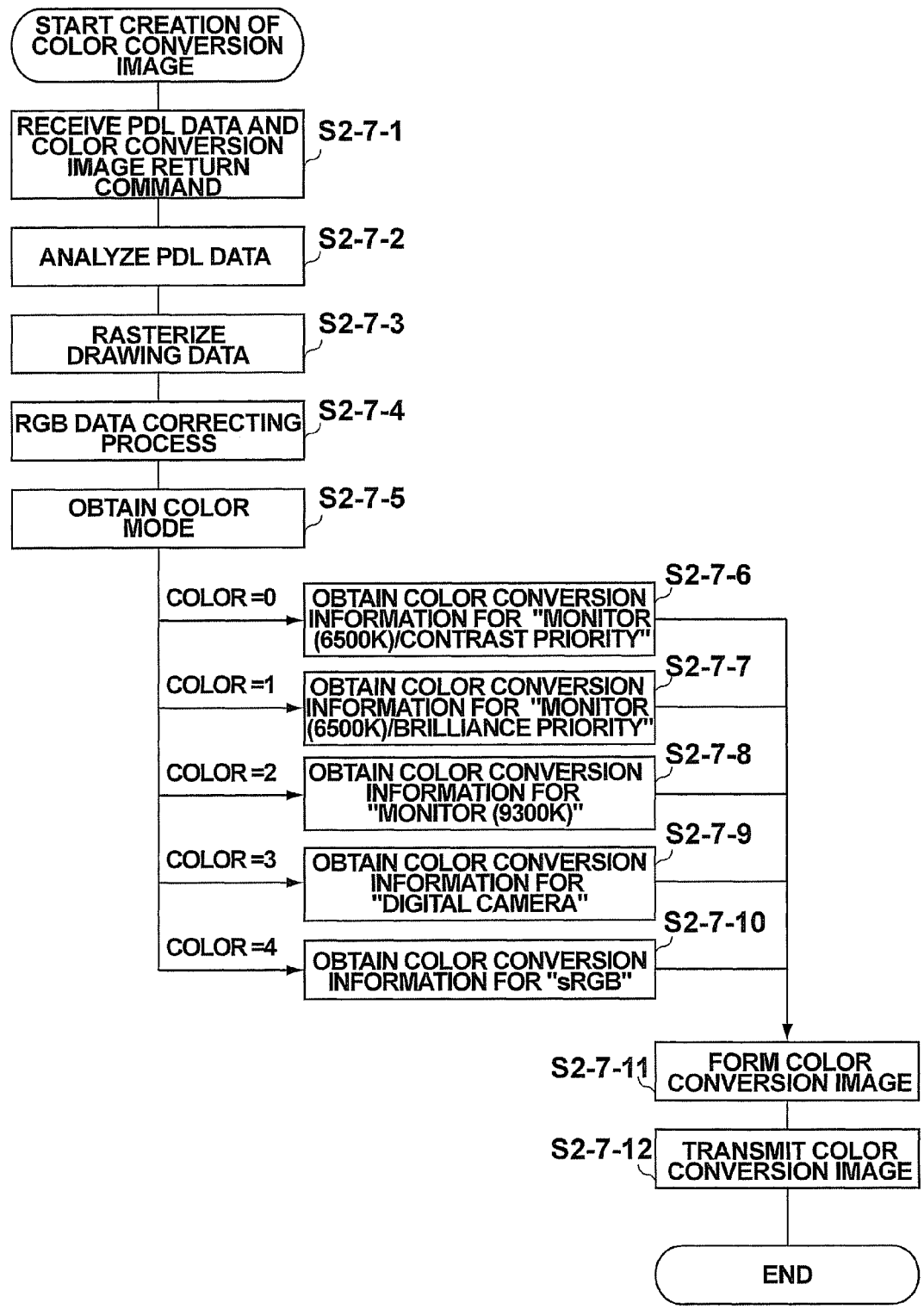
FIG. 14 is a detailed flowchart of step S2-7.

FIG. 14 is a detailed flowchart of step S2-7.

Step S2-7-1:

The print data receiving section 9010 (FIG. 12) receives the PDL data and the color conversion image return command from the printer driver 10000.

Step S2-7-2:

The print data analyzing section 9020 (FIG. 12) receives the PDL data from the print data receiving section 9010 (FIG. 12), analyzes it, extracts the drawing data, color reproducing mode setting, and print quality setting, and transmitting the drawing data to the rasterizer 9050 (FIG. 12), the color reproducing mode setting to the color conversion information storing section 9030 (FIG. 12), and the print quality setting to the printer characteristics information storing section 9040 (FIG. 12), respectively.

Step S2-7-3:

The rasterizer 9050 (FIG. 12) receives the drawing data from the print data analyzing section 9020 (FIG. 12), develops into the RGB data of the bit map, and transmits it to the RGB correcting portion 9060 (FIG. 12).

Step S2-7-4:

When the RGB bit map data is received from the rasterizer 9050 (FIG. 12), the RGB correcting portion 9060 (FIG. 12) corrects it by sRGB and transmits it as a correction RGB bit map data to the gamut mapping processing portion 9070 (FIG. 12).

Step S2-7-5:

The gamut mapping processing portion 9070 (FIG. 12) obtains the color reproducing mode (color=0 to 4) from the color mode command.

Steps S2-7-6 to S2-7-10:

The gamut mapping processing portion 9070 (FIG. 12) obtains the color conversion information corresponding to the obtained color reproducing mode (color=0 to 4).

Step S2-7-11:

The gamut mapping processing portion 9070 (FIG. 12) receives the corrected RGB bit map data from the RGB correcting portion 9060 (FIG. 12), converts it into Lab bit map data, maps the Lab bit map data on the basis of the color conversion information (color conversion table) obtained from the color conversion information storing section 9030 (FIG. 12), and forms the color conversion image compressed into the range which can be reproduced by the printer.

Step S2-7-12:

The gamut mapping processing portion 9070 (FIG. 12) recognizes the color conversion image return command and returns the color conversion image to the data receiving section 10030 (FIG. 11) of the personal computer 8000, and the processing routine is finished.

By tracing the flow described above, the user observes the images of the color reproducing modes displayed in FIG. 7, selects and sets the desired color reproducing mode, and sets (or confirms) the print quality again. Thus, the PDL data added with the designation command according to the user's desired color reproducing mode and print quality is formed and transmitted to the printer 9000 (FIG. 11).

Although the explanation has been made above on the assumption that the personal computer 8000 (FIG. 11) transmits the data to the printer 9000 (FIG. 12) every color reproducing mode (five times here), the invention is not limited to such an example. That is, it is also possible to transmit the original data only once and request the return of all of the data converted by all modes which are supported by the printer on the basis of the data. Further, it is also possible to construct in such a manner that, for example, a print operation discriminating section or the like for discriminating an operating mode of the printer connected to the personal computer 8000 (FIG. 11) is further provided, and when the printer 9000 (FIG. 12) is busy, a printer in an idle mode of the same kind as that of the printer 9000 (FIG. 12) is searched and the data is transmitted thereto. Although the display screen size of the drawing data received from the application 4000 (FIG. 11) is not mentioned in the above explanation, the processing speed can be also raised by executing the above processes in the state where the data size has been reduced into, for example, 1/32 or 1/64 without processing the received drawing data as it is or by executing the above processes to a part of the drawing data.

As described above, according to the embodiment, since the images to which the characteristics of the printer have been reflected can be displayed on the monitor even in the case where the printer driver does not have the printer characteristics but only the printer has the image converting process, such an effect that the user can easily select the desired hue by observing the monitor images in a manner similar to the embodiment 1 is obtained. Thus, such an effect that the unnecessary consumption amount of the sheets, toner, and the like can be reduced is obtained. Further, since the monitor images are displayed in consideration of the color characteristics of the monitor and the printer, an effect in which there is no difference between the hue of the monitor image and that of the print characteristics image differ is obtained.

Although the embodiments have been described with respect to the case where the invention has been applied to the print data forming apparatus for the printer having a plurality of color reproducing modes, the invention is not limited to such an example. That is, the invention can be applied to a print data forming apparatus for a printer having a plurality of monochromatic reproducing modes. The invention can be also applied to a print data forming apparatus for a printer having a plurality of character decorating modes.

It should be understood by those skilled in the art that various modifications, combinations, sub-combinations and alterations may occur depending on design requirements and other factors insofar as they are within the scope of the appended claims or the equivalents thereof.

What is claimed is:

1. A print data forming apparatus which forms a print characteristics image from received image information and transmits said print characteristics image to a printing apparatus, comprising:

an image conversion information storing section which previously stores a plurality of sets of image conversion information, including a first set of image conversion information and a second set of image conversion information that is different from said first set of image conversion information;

a mode shift detecting section for detecting a shift toward an image converting mode which performs a selection of said sets of image conversion information and performs an image conversion;

a print characteristics image conversion processing section which, when said mode shift detecting section detects the shift to said image converting mode, forms a plurality of print characteristics images from said received image information based on said plurality of sets of image conversion information stored in said image conversion information storing section, the plurality of print characteristics images formed by said print characteristics image conversion processing section including a first print characteristics image formed by using said first set of image conversion information and a second print characteristics image formed by using said second set of image conversion information;

a display image conversion processing section which converts said plurality of print characteristics images into a plurality of display characteristics images which can be displayed, said first print characteristics image being converted into a first display characteristics image and said second print characteristics image being converted into a second display characteristics image;

a displaying section which includes a display screen, said displaying section simultaneously displaying said plurality of display characteristics images and a plurality of series of characters corresponding to the respective sets of image conversion information on the display screen, a first one of the series of characters corresponding to the first set of image conversion information and being displayed beside said first display characteristics image and a second one of the series of characters corresponding to the second set of image conversion information and being displayed beside said second image characteristics image; and a print condition setting section which requests an operator to select a specific one of said plurality of display characteristics images displayed on said display screen.

2. The print data forming apparatus according to claim 1, further comprising a print characteristics information storing section which previously stores print characteristics information corresponding to a print quality of said printing apparatus, and wherein said print characteristics image conversion processing section forms the plurality of print characteristics images from said received image information based on said plurality of sets of image conversion information stored in said image conversion information storing section, and further, converts said plurality of print characteristics images on the basis of said sets of print characteristics information, and allows them to correspond to the print quality of said printing apparatus.

3. A print data forming apparatus which converts received image information into print data which can be analyzed by a predetermined printing apparatus and transmits said print data to said printing apparatus, comprising:

an image conversion storing section which stores a plurality of sets of image conversion information, including a first set of image conversion information and a second set of image conversion information that is different from said first set of image conversion information;

a mode shift detecting section which detects a shift toward an image converting mode which selects a plurality of said sets of image conversion information and performs an image conversion;

an application data converting section which, when said mode shift detecting section detects the shift to said image converting mode, converts said received image information into the print data which can be analyzed by said printing apparatus;

a data transmitting section which transmits said print data and a return command for requesting a return of a plurality of print characteristics images converted on the basis of said plurality of sets of image conversion information to said printing apparatus, said return command including a command to return a first print characteristics image formed using said first set of image conversion information and a command to return a second print characteristics image formed using said second set of image conversion information;

a data receiving section which receives the return of said plurality of print characteristics images;

a display image conversion processing section which converts said plurality of returned print characteristics images into a plurality of display characteristics images which can be displayed, said plurality of display characteristics images including a first display characteristics image based on said first print characteristics image and a second display characteristics image based on said second print characteristics image;

a displaying section which includes a screen, said displaying section simultaneously displaying said plurality of display characteristics images, including said first and second display characteristics images, on said screen; and a print condition setting section which requests an operator to select a specific one of said plurality of display characteristics images displayed on said screen, wherein when said print condition setting section receives the selection of a specific display characteristics image, and wherein said application data converting section allows a designation command of said image conversion information corresponding to said selected specific display characteristics image to be included in said print data.

4. The print data forming apparatus according to claim 3, wherein said application data converting section reduces a size of said received image information and converts the image information into the print data which can be analyzed by said printing apparatus.

5. The print data forming apparatus according to claim 3, wherein said application data converting section converts partial data of said received image information into the print data which can be analyzed by said printing apparatus.

6. The print data forming apparatus according to claim 1, further comprising an image conversion information transmission request section which requests said printing apparatus to transmit predetermined image conversion information and obtains said image conversion information in place of said image conversion information storing section which previously stores said plurality of image conversion information, and wherein when said mode shift detecting section detects the shift to said image converting mode, said print characteristics image conversion processing section forms the plurality of print characteristics images based on the plurality of respective image conversion information obtained by said image conversion information transmission request section from said received image information.

7. The print data forming apparatus according to claim 6, further comprising a print characteristics information transmission request section which requests said printing apparatus to transmit print characteristics information corresponding to a print quality of said printing apparatus and obtains said print characteristics information, and wherein said print characteristics image conversion processing section forms the plurality of print characteristics images based on the plurality of respective image conversion information obtained by said image conversion information transmission request section from said received image information, and further converts said plurality of print characteristics images on the basis of said print characteristics information, and allows them to correspond to the print quality of said printing apparatus.

8. The print data forming apparatus according to claim 1, wherein said print characteristics image conversion processing section reduces a size of said received image information and forms the print characteristics image based on said predetermined image conversion information.

9. The print data forming apparatus according to claim 3, further comprising a print operation discriminating section which discriminates an operating mode of said printing apparatus connected to said print data forming apparatus, wherein when said print operation discriminating section determines a busy mode of said predetermined printing apparatus, and wherein said data transmitting section transmits said print data and the return command for requesting the return of the plurality of print characteristics images converted on the basis of said plurality of respective image conversion information to another printing apparatus whose idle mode is determined by said print operation discriminating section and which has the same function as that of said predetermined printing apparatus in place of said predetermined printing apparatus.

10. The print data forming apparatus according to claim 1, wherein said sets of image conversion information are selected from the group consisting of a conversion table for monitor contrast priority, a conversion table for monitor brilliance priority, a conversion table for monitor color, a conversion table for a digital camera, and a conversion table for sRGB.

11. The print data forming apparatus according to claim 1, wherein plurality of series of characters that are displayed on the display screen are selected from the group consisting of a first series of characters specifying monitor contrast priority, a second series of characters specifying monitor brilliance priority, a third set of characters specifying monitor color, a fourth set of characters specifying a digital camera, and a fifth set of characters specifying sRGB.

12. The print data forming apparatus according to claim 3, wherein said sets of image conversion information are selected from the group consisting of a conversion table for monitor contrast priority, a conversion table for monitor brilliance priority, a conversion table for monitor color, a conversion table for a digital camera, and a conversion table for sRGB.

13. The print data forming apparatus according to claim 3, wherein said displaying section additionally displays sets of image conversion information adjacent corresponding ones of said plurality of display characteristics, the sets of image conversion information being selected from the group consisting of a first series of characters specifying monitor contrast priority, a second series of characters specifying monitor brilliance priority, a third set of characters specifying monitor color, a fourth set of characters specifying a digital camera, and a fifth set of characters specifying sRGB.

* * * * *